United States Patent
Hsiang et al.

(10) Patent No.: US 9,491,336 B2
(45) Date of Patent: Nov. 8, 2016

(54) CAMERA DEVICE AND METHOD FOR CONTROLLING A CAMERA DEVICE

(71) Applicant: HTC Corporation, Taoyuan (TW)

(72) Inventors: Ko-Hsin Hsiang, Taoyuan (TW); Kenneth Todd Culos, Taoyuan (TW); Wen-Chien Liu, Taoyuan (TW); Wen-Chuan Lee, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/682,778

(22) Filed: Apr. 9, 2015

(65) Prior Publication Data
US 2015/0365596 A1    Dec. 17, 2015

Related U.S. Application Data

(60) Provisional application No. 62/012,791, filed on Jun. 16, 2014.

(51) Int. Cl.
*H04N 5/225* (2006.01)
*H04N 5/232* (2006.01)

(52) U.S. Cl.
CPC ........ *H04N 5/2252* (2013.01); *H04N 5/23203* (2013.01); *H04N 5/23241* (2013.01); *H04N 5/23245* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 4,368,490 | A * | 1/1983 | Takimoto | G11B 31/006 315/106 |
| 6,411,332 | B1 | 6/2002 | Whitby et al. | |
| 6,888,574 | B1 * | 5/2005 | Asakura | H04N 5/232 348/231.99 |
| 2003/0160892 | A1 | 8/2003 | Tamura | |
| 2005/0254358 | A1 * | 11/2005 | Kosako | H04N 5/2252 369/44.14 |
| 2006/0072033 | A1 * | 4/2006 | Oran | H04N 5/2251 348/376 |
| 2007/0054522 | A1 | 3/2007 | Choi et al. | |
| 2007/0113110 | A1 | 5/2007 | Mizutani | |

(Continued)

FOREIGN PATENT DOCUMENTS

| | | | | |
|---|---|---|---|---|
| JP | | 10173971 A | * 6/1998 | |
| KR | WO | 2014204022 A1 | * 12/2014 | G06F 1/1694 |

(Continued)

OTHER PUBLICATIONS

Mills, "Periscope Camera by Yaniv Berg," Dezeen, Aug. 18, 2010, pp. 1/33-7/33, obtained from http://www.dezeen.com/2010/08/18/periscope-camera-by-yaniv-berg/.

(Continued)

*Primary Examiner* — Justin P Misleh
(74) *Attorney, Agent, or Firm* — Birch, Stewart, Kolasch & Birch, LLP

(57) ABSTRACT

A camera device. A housing includes a first portion, a second portion and a curved portion disposed between the first portion and the second portion and including a curved surface. The lens is disposed on an end surface of the housing. The image sensor is coupled to the lens for obtaining image data captured by the lens. The first input unit is disposed on the curved surface and provided as a first input interface for a user. The grip sensor is disposed on the first portion for sensing whether the first portion is held by the user. The lens and the image sensor operate in a sleep mode by default to reduce power consumption. When the grip sensor senses that the first portion is held by the user, the grip sensor generates a sensing signal to wake up the lens and the image sensor.

21 Claims, 11 Drawing Sheets

(56) References Cited

U.S. PATENT DOCUMENTS

| | | |
|---|---|---|
| 2009/0325493 A1 | 12/2009 | Suzuki |
| 2010/0188517 A1 | 7/2010 | Isono |
| 2010/0207024 A1 | 8/2010 | Thiele et al. |
| 2010/0245601 A1* | 9/2010 | Kato .................. H04N 5/23248 348/208.4 |
| 2010/0253792 A1 | 10/2010 | Kawaguchi et al. |
| 2011/0106954 A1 | 5/2011 | Chatterjee et al. |
| 2012/0213134 A1* | 8/2012 | Woo ....................... G06F 1/3209 370/311 |
| 2012/0274774 A1 | 11/2012 | Bushee |
| 2012/0287315 A1 | 11/2012 | Huang et al. |
| 2013/0011127 A1 | 1/2013 | Lawton |
| 2013/0188058 A1 | 7/2013 | Nguyen et al. |
| 2013/0235234 A1 | 9/2013 | Cucci et al. |
| 2014/0032880 A1* | 1/2014 | Ka ....................... G06F 9/3885 712/30 |
| 2014/0094198 A1 | 4/2014 | Heo et al. |
| 2014/0168494 A1* | 6/2014 | Hong .................... G06F 1/3287 348/333.01 |

FOREIGN PATENT DOCUMENTS

| | | |
|---|---|---|
| TW | 200941125 A1 | 10/2009 |
| TW | 201310984 A1 | 3/2013 |
| WO | WO 2012/037139 A2 | 3/2012 |

OTHER PUBLICATIONS

Zhang, "Rethinking the Design of DSLR Cameras," PetaPixel, Nov. 30, 2009, pp. 1/8-3/8, obtained from http://petapixel.com/2009/11/30/rethinking-the-design-of-dslr-cameras/.

* cited by examiner

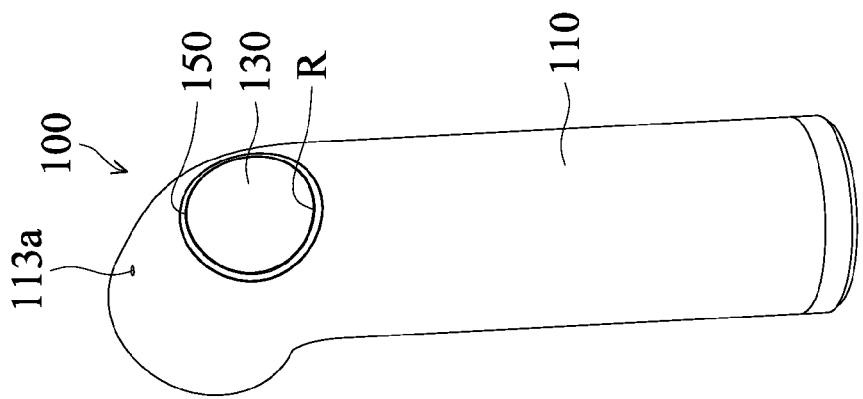
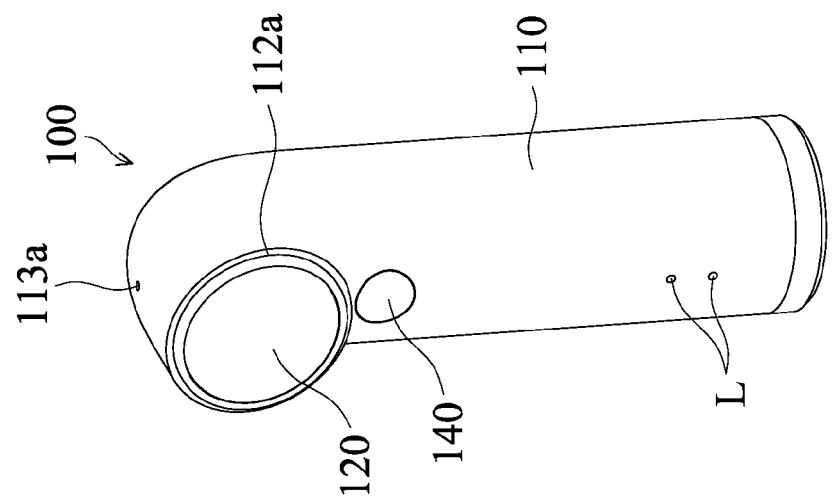

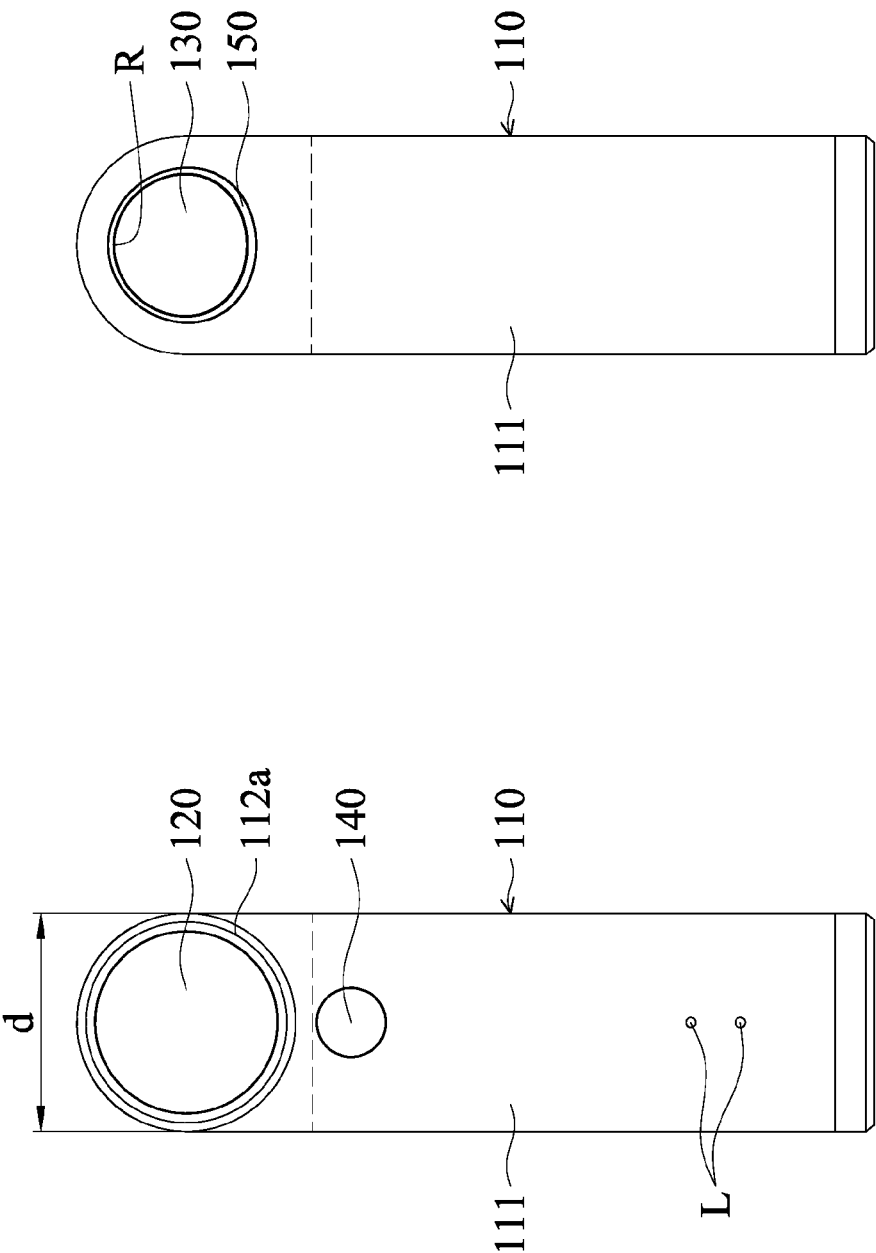

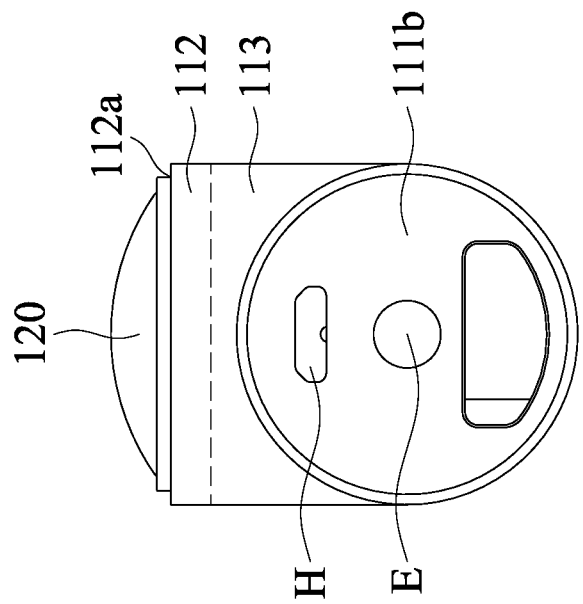
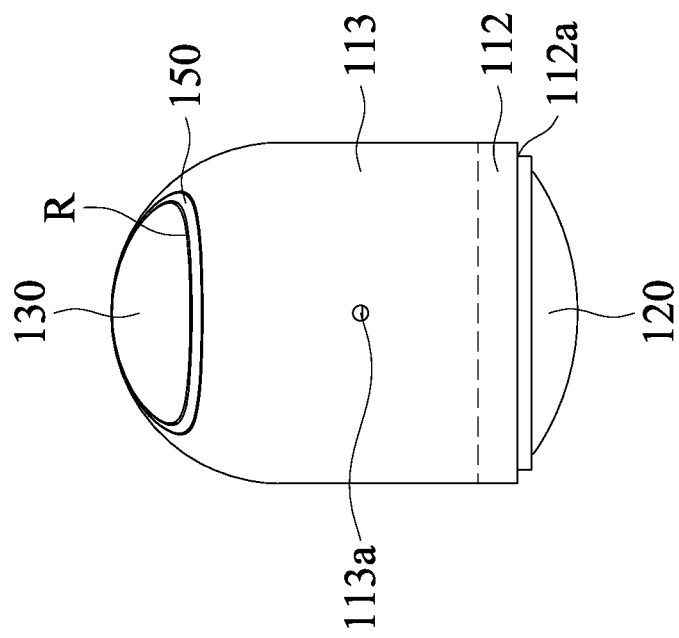
FIG. 7
FIG. 8

CAMERA DEVICE AND METHOD FOR CONTROLLING A CAMERA DEVICE

CROSS REFERENCE TO RELATED APPLICATIONS

This application claims the benefit of U.S. Provisional Application No. 62/012,791 filed Jun. 16, 2014 and entitled "Camera Device", the entire contents of which are hereby incorporated by reference.

BACKGROUND OF THE INVENTION

1. Field of the Invention

The invention relates to a camera device and method for controlling a camera device, and more particularly to a camera device and method for controlling a camera device that consumes less power and is easy for a user to hold and operate.

2. Description of the Related Art

Recently, camera devices have become important consumer electronic products. As technology advances, such camera devices are getting smaller and lighter, and it has become more convenient for users to carry a camera device on their person every day to record their day-to-day activities.

However, when a user uses a camera device to take a picture or record a video, the user must normally use a viewfinder to view the scene that he or she wants to capture. Usually, after an activity is ended, the user may realize that he or she has been viewing the world only through the viewfinder during the activity and may feel a lack of any real sense of participation.

Therefore, a novel camera device and method for controlling a camera device are highly required; especially a camera device and method for controlling a camera device that consumes less power and is easy for the user to hold and operate.

BRIEF SUMMARY OF THE INVENTION

A camera device and a method for controlling a camera device are provided. An exemplary embodiment of the camera device comprises a housing, a lens, an image sensor, a first input unit and a grip sensor. The housing comprises a first portion, a second portion and a curved portion disposed between the first portion and the second portion and comprising a curved surface. The lens is disposed on an end surface of the housing. The image sensor is coupled to the lens for obtaining image data captured by the lens. The first input unit is disposed on the curved surface of the curved portion and provided as a first input interface for a user. The grip sensor is disposed on the first portion for sensing whether the first portion is held by the user. The lens and the image sensor operate in a sleep mode by default to reduce power consumption. When the grip sensor senses that the first portion is held by the user, the grip sensor generates a sensing signal to wake up the lens and the image sensor.

In an embodiment of a method for controlling a camera device, for a camera device comprising a housing, a lens, an image sensor, a first input unit and a grip sensor, the housing comprising a first portion, a second portion and a curved portion disposed between the first portion and the second portion and comprising a curved surface, the lens being disposed on an end surface of the housing, the image sensor being coupled to the lens for obtaining image data captured by the lens, the first input unit being disposed on the curved surface of the curved portion and provided as a first input interface for a user, and the grip sensor being disposed on the first portion, the method comprising: controlling the lens and the image sensor to operate in a sleep mode to reduce power consumption; sensing whether the first portion is held by the user via the grip sensor; and generating a sensing signal to wake up the lens and the image sensor when sensing that the first portion is held by the user.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 1 shows a side view of a camera device according to an embodiment of the invention;

FIG. 2 shows another side view of a camera device according to an embodiment of the invention;

FIG. 3 shows a front view of a camera device according to an embodiment of the invention;

FIG. 4 shows a front view of a rear device according to an embodiment of the invention;

FIG. 7 shows a top view of a camera device according to an embodiment of the invention;

FIG. 8 shows a bottom view of a camera device according to an embodiment of the invention;

DETAILED DESCRIPTION OF THE INVENTION

Figure 6:
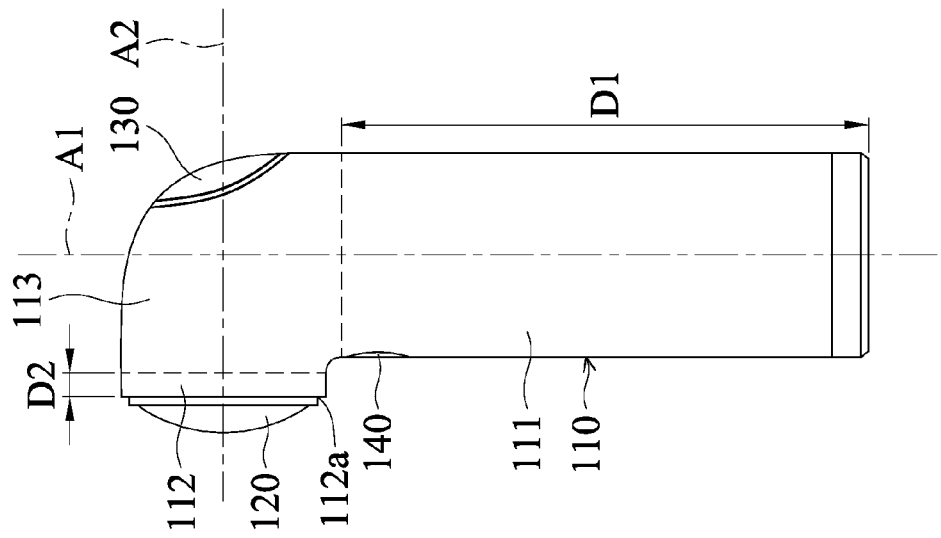
FIG. 6 shows a right side view of a camera device according to an embodiment of the invention.

The following description is of the best-contemplated mode of carrying out the invention. This description is made for the purpose of illustrating the general principles of the invention and should not be taken in a limiting sense. The scope of the invention is best determined by reference to the appended claims.

FIG. 1 shows a side view of a camera device according to an embodiment of the invention. FIG. 2 shows another side view of a camera device according to an embodiment of the invention. Referring to FIG. 1 and FIG. 2, an embodiment of a camera device 100 comprises a housing 110, a lens 120, a first input unit 130, a second input unit 140, and an annular member 150, wherein an image sensor is disposed in the camera device 100 and coupled to the lens 120 for taking a picture and recoding a video. As shown in FIG. 1 and FIG. 2, the lens 120, the first input unit 130, the second input unit 140, and the annular member 150 are disposed on the housing 110 and exposed to the surface thereof. According to an embodiment of the invention, the first input unit 130 may be a first input interface provided for the user. For example, the first input unit 130 may be a shutter button. When the user presses the first input unit 130, image data can be caught by the lens 120 and the image sensor. The second input unit 140 may be a second input interface provided for the user. For example, the second input unit 140 may be a switch button for switching a plurality of camera modes (for instance, a slow-motion mode, a normal photography mode, a time-lapse photography mode, or a macro-photography mode) of the camera device 100. Note that in some embodiments, the first input unit 130 and the second input unit 140 may also be touch sensors, optical sensors, or mechanical-type input members for input.

FIG. 3 to FIG. 8 respectively show a front view, a rear view, a left side view, a right side view, a top view, and a bottom view of the camera device 100 according to an embodiment of the invention. Referring to FIG. 1, FIG. 2, and FIG. 3 to FIG. 8, the housing 110 can be made of metal or plastic, and may have an L-shaped structure (such as the shape of a cane or a periscope). In this embodiment, the housing 110 can be integrally formed in one piece. The L-shaped structure can be divided into a first portion 111, a second portion 112, and a curved portion 113 (FIG. 5), wherein the curved portion 113 is disposed between the first portion 111 and the second portion 112, and includes a curved surface C. An opening R is formed on the curved surface C with the first input unit 130 disposed therein.

Specifically, the annular member 150 is disposed around the first input unit 130, and the material of the annular member 150 is different from that of the curved portion 113. Therefore, when the user uses the camera device, the position of the first input unit 130 can be directly perceived by touch, without visual contact. For example, the annular member 150 comprises metal, and the curved portion 113 comprises plastic. In another embodiment, an annular protrusion may be formed around the first input unit 130 on the curved portion 113 for replacing the aforementioned annular member 150. Furthermore, in this embodiment, the first input unit 130 comprises a surface 131 aligned with the curved surface C (FIG. 5), so as to achieve an integrated appearance for the camera device 100.

Referring to FIG. 1, FIG. 2, and FIG. 6, the first portion 111 and the second portion 112 respectively comprise a cylindrical structure. The first portion 111, the second portion 112, and the curved portion 113 respectively comprise a circular cross-section. A length D1 along an axial direction of the first portion 111 is about 10-20 times a length D2 along an axial direction of the second portion 112 (for example, 15 times). Thus, when using the camera device 100, the user can hold the first portion 111 tightly in one hand, and keep the center of gravity of the camera device 100 steady. Moreover, the housing 110 comprises an L-shaped structure, such that the camera device will not slip out easily. As shown in FIG. 3 and FIG. 6, in this embodiment, a central axis A1 of the first portion 111 is substantially perpendicular to a central axis A2 of the second portion 112, and the first portion 111 and the second portion 112 have the same diameter d. In some embodiments, the diameter of the second portion 112 can exceed that of the first portion 111 for providing a larger lens 120 to receive light in a wider angle.

Specifically, the aforementioned length D1 along the axial direction of the first portion 111 is about 5-10 cm, and the diameter d is about 2-5 cm. Thus, the camera device 100 can be easily gripped in one hand of the user.

Referring to FIG. 6 and FIG. 7, the first input unit 130 is disposed on the central axis A2 of the second portion 112, and the second portion 112 comprises an end surface 112a. The lens 120 protrudes from the end surface 112a, that is, the second portion 112 is disposed between the first input unit 130 and the lens 120. In this embodiment, the light-receiving angle of the lens 120 is about 120° to 250°. Furthermore, as shown in FIG. 7, the curved portion 113 comprises a hole 113a disposed between the first input unit 130 and the lens 120. The hole 113a is used to house at least one microphone (not shown) inside of the camera device 100 to receive external sound to be recorded. In another embodiment, the camera device 100 may further comprise a display (not shown), preferably a flexible display disposed between the first input unit 130 and the lens 120. Namely, the display is disposed in the position of the hole 113a, and the hole 113a is disposed in another position, such as a position adjacent to the first input unit 130.

Figure 5:
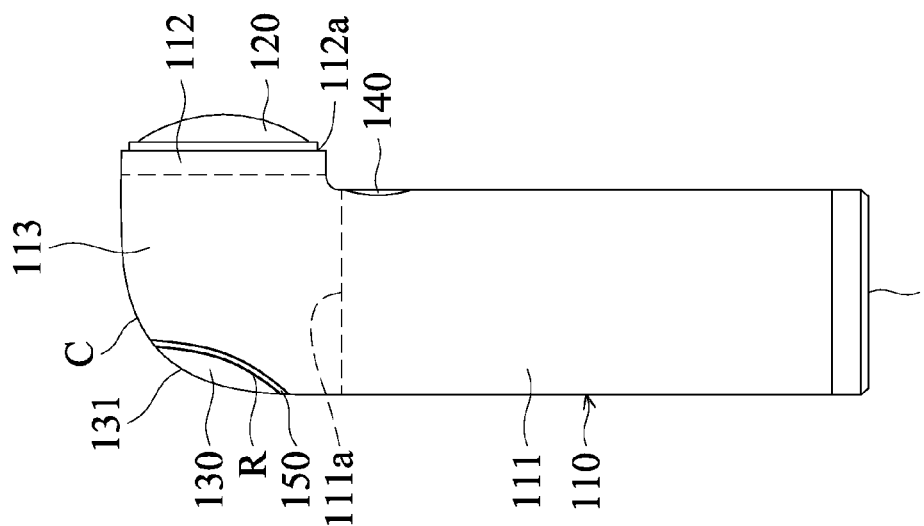
FIG. 5 shows a left side view of a camera device according to an embodiment of the invention.

As shown in FIG. 3 and FIG. 5, the second input unit 140 is disposed on the first portion 111 and adjacent to the second portion 112. The first and second input units 130 and 140 are disposed on the opposite sides of the housing 110. Therefore, the user can easily press or operate the first and second input units 130, 140 when gripping the first portion 111. For example, the user can press the first input unit 130 with his thumb to trigger the lens and image sensor to take a picture or record a video. The second button 140 can also be pressed by the forefinger for switching the camera modes. Moreover, a plurality of indicator lights L are disposed on the first portion 111 for showing the level of remaining battery power and the camera mode.

As shown in FIG. 5 and FIG. 8, the first portion 111 has a first end 111a and a second end 111b opposite to the first end 111a, wherein the first end 111a connects to the curved portion 113, and a recess E and a connecting hole H are formed on the second end 111b. The connecting hole H may be a USB port for connecting an electronic device (a personal computer, for instance) or an external power source. The recess E may be a threaded hole with a camera tripod or a rod connected thereto, such that the user can easily support or hold the camera.

It should be noted that, in this embodiment, the housing 110 comprises a waterproof material, and some waterproof mechanisms are disposed around the opening R, the end surface 112a, the recess E, and the connecting hole H to prevent water from entering the interior of the housing 110. Thus, the camera device 100 can be used to photograph water sports, such as surfing and diving.

Figure 9:
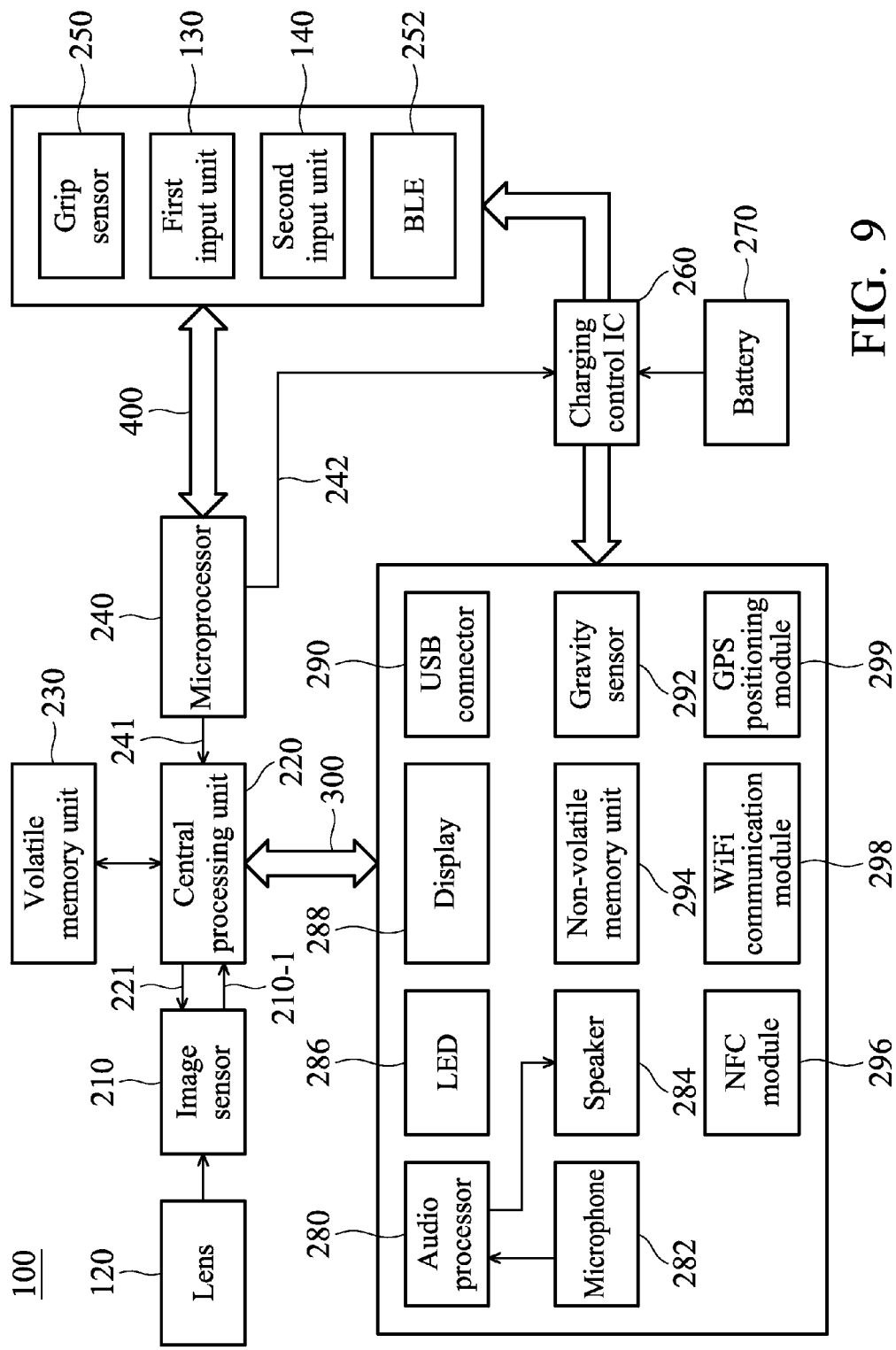
FIG. 9 is a block diagram of a camera device according to an embodiment of the invention.

FIG. 9 is a block diagram of a camera device according to an embodiment of the invention. Referring to FIG. 1 and FIG. 9, in this embodiment, the camera device 100 further comprises an image sensor 210 coupled with the lens 120, a central processing unit 220, a volatile memory unit 230 (for example, a RAM), a microprocessor 240, a grip sensor 250, a Bluetooth low-energy (BLE) module 252 providing Bluetooth communication services, a charging control IC 260, a battery 270, and input/output elements 280-299. The central processing unit 220 electrically connects to the image sensor 210, the volatile memory unit 230, the microprocessor 240, and the input/output elements 280-299 through different connecting interfaces, such as I2C, USB, SDIO, UART, SPI, GPIO, or other series or parallel interfaces of the industrial standard, depending on different circuit-design requirements. It should be noted that, in this embodiment, the electrical connections between the central processing unit 220 and different connecting interfaces of the input/output elements 280-299 are represented by a double arrow 300 for simplicity. The input/output elements 280-299 comprise an audio processor 280, a microphone 282, a speaker 284, at least one light-emitting diode 286, a display 288 (preferably a flexible display), a USB connector 290, a gravity sensor 292, a non-volatile memory unit 294 (for example, a flash memory or an SD card), a near-field communication (NFC) module 296, a WiFi communication module 298, and a GPS positioning module 299.

Furthermore, the microprocessor 240 not only electrically connects to the central processing unit 220, but also electrically connects to the first input unit 130, the second input unit 140, the grip sensor 250, the BLE module 252, and the charging control IC 260 through difference connecting interfaces, such as I2C, USB, SDIO, UART, SPI, GPIO, or other series or parallel interfaces of the industrial standard, depending on different circuit design requirements. The charging control IC 260 electrically connects to the battery 270 for distributing the electric power of the battery 270 to the aforementioned electronic elements 130, 140, 210, 220, 230, 240, 250, 252, and 280-299, such that the aforementioned electronic elements can operate normally.

The image sensor 210 is used to capture image data through the lens 120, and the central processing unit 220 can store the image data in the volatile memory unit 230 (for example, RAM). Subsequently, the image data can be stored in the non-volatile memory unit 294 after image processing. It should be noted that the central processing unit 220 may further perform tilt correction on the image data to obtain at least one modified image.

Figure 10:
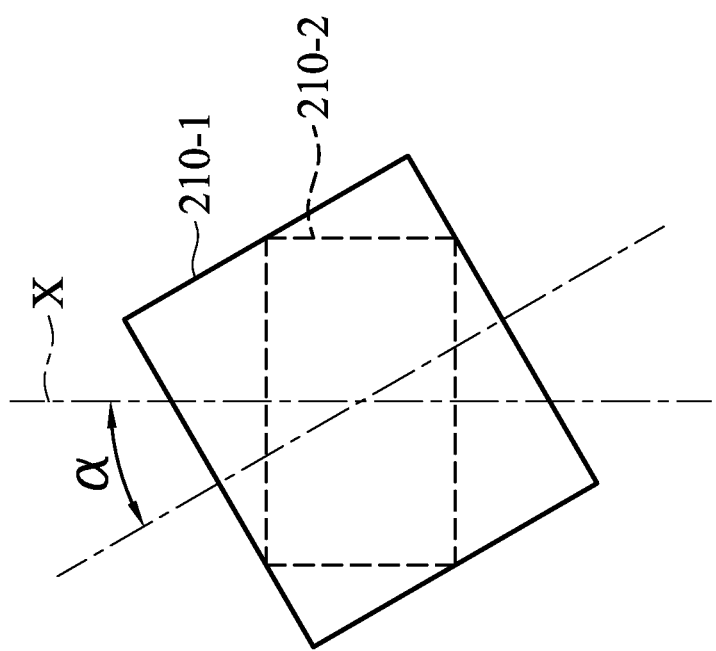
FIG. 10 is a schematic diagram showing the tilt correction according to an embodiment of the invention.

FIG. 10 is a schematic diagram showing the tilt correction according to an embodiment of the invention. As shown in FIG. 10, the gravity sensor 292 can define a default axis X representing the camera device 100 being held in the hand of the user perpendicular to the horizontal plane (referring to FIG. 11). When the image sensor 210 captures an image 210-1 and the gravity sensor 292 detects that the central axis of the camera device 100 deviates from the default axis X, and if an angle α between the central axis and the default axis X is less than a predetermined angle θ, the central processing unit 220 can cut the aforementioned image 210-1 automatically and generate a modified image 210-2 (as the rectangular area indicated by the dotted lines in FIG. 10). Thus, a slanted image being generated by the slanted camera device 100 can be avoided. In this embodiment, the predetermined angle θ is 3°-20° (for example, 6°). It should be noted that the central processing unit 220 may further enlarge the modified image 210-2, such that the enlarged image is the same size as the original image 210-1.

Furthermore, the grip sensor 250 is disposed on the first portion 111 for sensing variations in the electric field, the magnetic field, the pressure, and/or the temperature. When the user touches or grips the first portion 111, the grip sensor 250 can detect that the first portion 111 is held by an object (for instance, the hand of the user), and transmit a sensing signal to the microprocessor 240. Afterward, the microprocessor 240 generates and transmits a control signal 241 to the central processing unit 220 according to the sensing signal, and the central processing unit 220 transmits an enable signal 221 to wake up and/or enable the image sensor 210 to capture the image 210-1 according to the control signal 241. When the camera is not set in a recording mode or a time-lapse photography mode, and the user is not in touch with the first portion 111, the central processing unit 220 switches to a sleep mode, to save power.

Moreover, the camera device 100 may have wireless transmission functionality. When the user launches an application installed in an electronic device (for example, a smartphone or a personal computer), the camera device 100 can transmit the image data stored in the non-volatile memory unit 294 to the electronic device via wireless transmission (for instance, by the BLE module 252 or the WiFi communication module 298).

According to an embodiment of the invention, when one of the first input unit 130 and the second input unit 140 is pressed, the lens 120 and image sensor 210 can be triggered to take a picture or record a video. For example, when one of the first input unit 130 and the second input unit 140 is set as a shutter button to trigger the lens 120 and image sensor 210 to take a picture or record a video, the other of the lens 120 and image sensor 210 can be set as a switch button for switching the camera mode.

Figure 11:
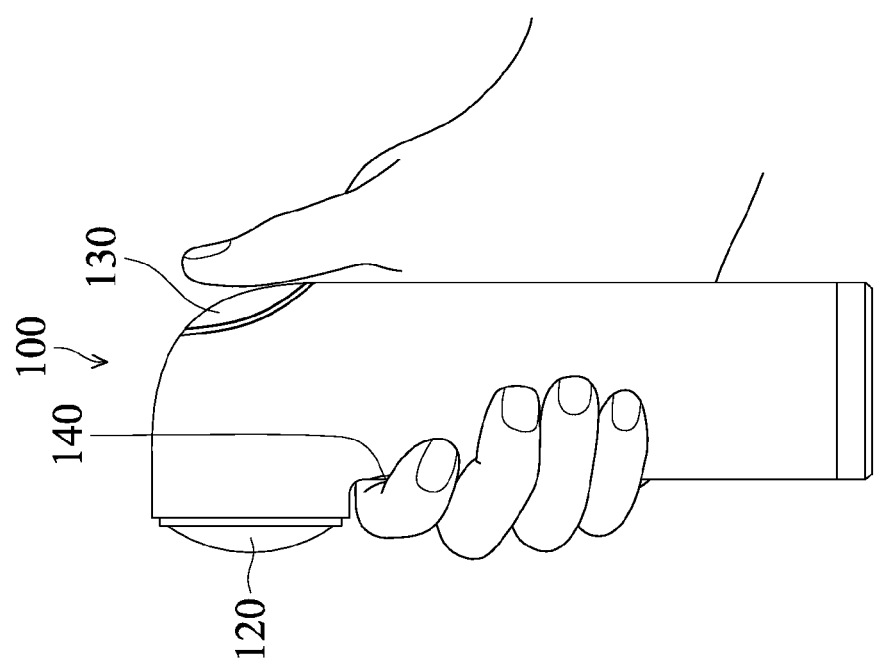
FIG. 11 is a schematic diagram showing a method of using the camera device 100 to take a photograph according to an embodiment of the invention.

FIG. 11 is a schematic diagram showing a method of using the camera device 100 to take a photograph according to an embodiment of the invention. When in a normal mode, the user can press or touch the first input unit 130 to control the camera device 100 for photography/video recording. Meanwhile, the user can press or touch the second input unit 140 to switch between the photography mode and the video recording mode.

Figure 12:
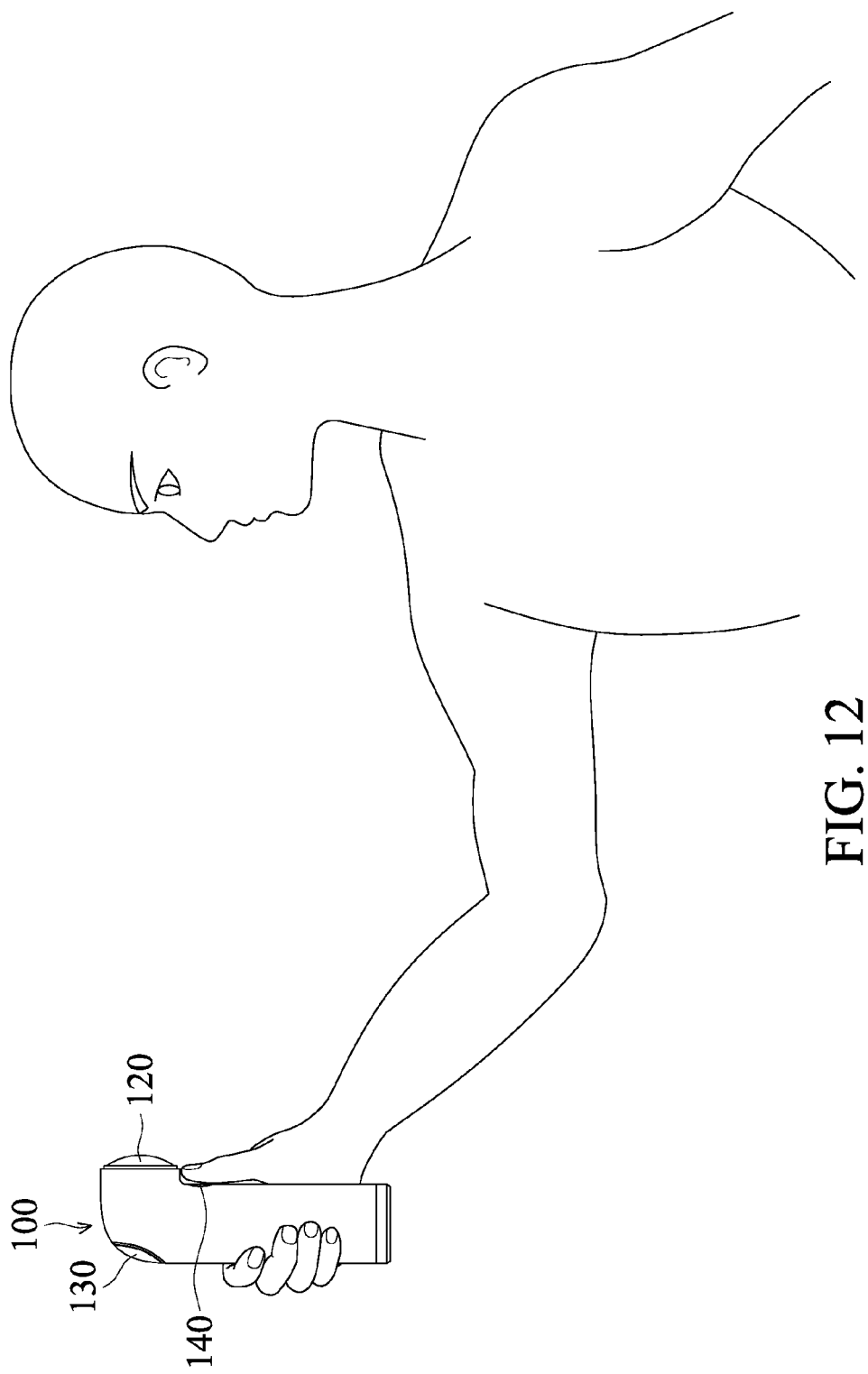
FIG. 12 is a schematic diagram showing a method of using the camera device 100 to take a photograph according to another embodiment of the invention.

FIG. 12 is a schematic diagram showing a method of using the camera device 100 to take a photograph according to another embodiment of the invention. When in a selfie mode, the user can press or touch the second input unit 140 to control the camera device 100 for photographing/video recording. The camera device 100 can determine its orientation when gripped by the user. For example, the central processing unit 220 can analyze which portion or area of the camera device 100 is being held by the user through the grip sensor 250, thus determining whether the camera device 100 is facing forward (as shown in FIG. 11) or facing the user (as shown in FIG. 12). Additionally, the central processing unit 220 may take a picture in advance by the image sensor 210 to obtain a preview image. The central processing unit 220 can search for a target object in the preview image, and determine whether the target object fits a default shape or not. For example, if the target object fits the shape of a human face, the size of the target object fits a default value, and if the target object has a raised-arm portion, the camera device 100 can determine that it is being gripped and facing the user (as shown in FIG. 12). When the camera device 100 determines that it is facing the user, the central processing unit 220 can switch the camera mode of the camera device to the selfie mode, and also switch the function of the second input unit 140. The second input unit 140 can be set as a selfie button. When the second input unit 140 is pressed or touched, the central processing unit 220 instructs the camera device 100 to take a photograph.

Figure 13:
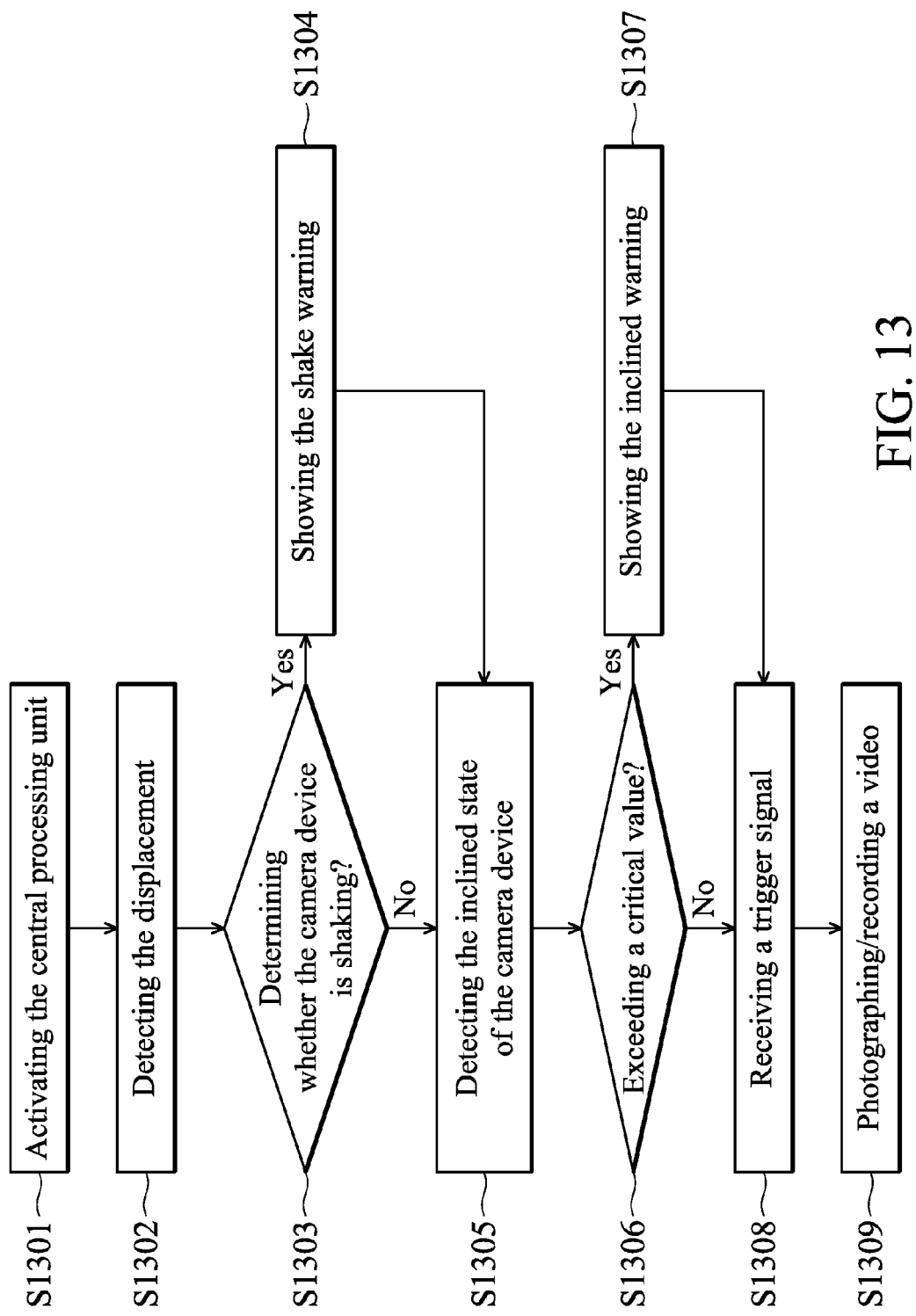
FIG. 13 is a flow chart of a method of using the camera device 100 to take a photograph according to an embodiment of the invention.

FIG. 13 is a flow chart of a method of using the camera device 100 to take a photograph according to an embodiment of the invention. Please refer also to FIG. 10 and FIG. 11. In step S1301, the central processing unit 220 is awakened after the camera device 100 receives a start signal. According to an embodiment of the invention, the start signal can be generated by the microprocessor 240 when the user touches or presses the first input unit 130 or the second input unit 140, or generated by the microprocessor 240 in response to the sensing signal generated when the grip sensor 250 sensed that the aforementioned first portion 111 is held by an object, or generated by the microprocessor 240 in response to a notification generated by the BLE module 252 about the success in pairing or establishing a communication with another electronic device. In step S1302, the central processing unit 220 can detect the displacement within a time interval through the gravity sensor 292. The displacement may happen because the user's hand is shaking, or the quick movement of the camera device 100. The central processing unit 220 can periodically receive a gravitational parameter from the gravity sensor 292, and detect the variance of the gravitational parameter within a time interval to calculate the displacement of the camera device 100. In step S1303, the central processing unit 220 can determine whether the camera device 100 is shaking. When the central processing unit 220 detects that the variance of the gravitational parameter exceeds a default value, the camera device 100 can be determined as being in a shaking state, and the photo or the video captured in this state might be blurred. If the camera device 100 is determined to be in a shaking state, step S1304 is then performed, wherein the camera device 100 shows a shake warning. The central processing unit 220 can instruct the display 288 to show a shake warning icon for alerting the user, or the LED 286 can emit a flashing light signal with a corresponding color for alerting the user that the camera device 100 is shaking. Subsequently, step S1305 is performed. Otherwise, when the central processing unit 220 recognizes that the camera device 100 is not shaking in step S1303, step S1305 is executed directly.

In step S1305, the central processing unit 220 can detect the inclined state of the camera device 100 through the gravity sensor 292, wherein the inclined state may be changed as the user may grip the camera device 100 at different angles. The central processing unit 220 can analyze the gravitational parameter obtained from the gravity sensor 292 and determine the inclined angle of the camera device 100.

In step S1306, the central processing unit 220 can determine whether the inclined state of the camera device 100 exceeds a critical value or not. If the central processing unit 220 detects that the inclined state of the camera device 100 exceeds the critical value, step S1307 is performed. In step S1307, the camera device 100 shows an inclined warning. The central processing unit 220 instructs the display 288 to show an inclined alarm icon for alerting the user, or the LED 286 emits a flashing light signal with another corresponding color for alerting the user that the inclined state of the camera device 100 exceeds the critical value, and the inclination calibration as shown in FIG. 10 is shut off. Then, step S1308 is performed. Otherwise, if the central processing unit 220 detects that the inclined state of the camera device 100 does not exceed the critical value in step S1303, the inclination calibration as shown in FIG. 10 is activated by the central processing unit 220, and step S1308 is performed directly.

In step S1308, the central processing unit 220 receives a trigger signal. The trigger signal can be generated when the user touches or presses the first input unit 130 or the second input unit 140, or directly transmitted by an external device through the NFC module 296, the BLE module 252 or the WiFi communication module 298 to the central processing unit 220. When the user uses the application installed in another electronic device to establish a connection with the camera device 100 and perform remote control, the trigger signal can be transmitted via the NFC module 296, the BLE module 252 or the WiFi communication module 298 to the central processing unit 220 to take a picture or record a video. In step S1309, the central processing unit 220 instructs the image sensor to photograph or record video.

Figure 14:
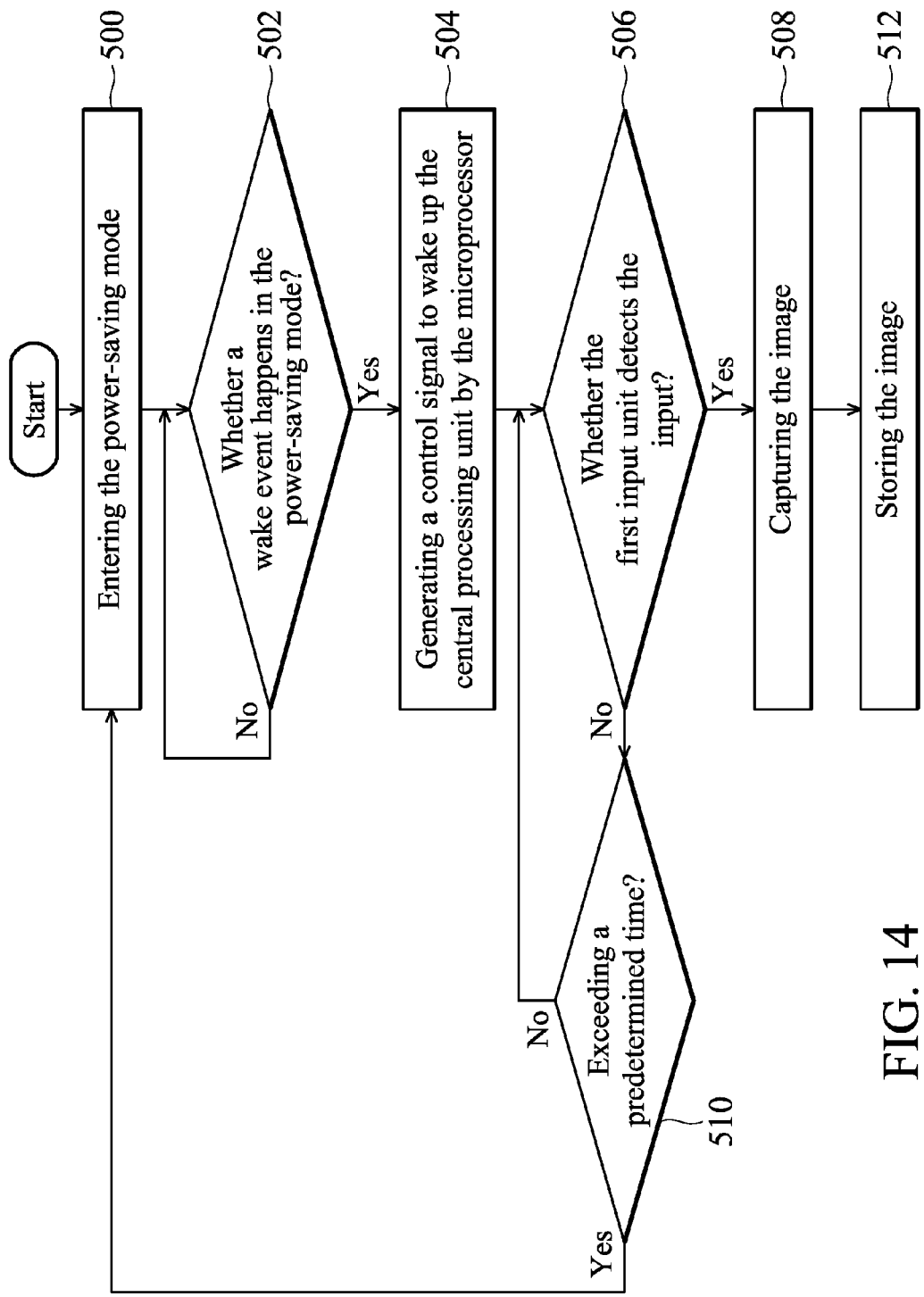
FIG. 14 is a flow chart of the operation of the camera device according to an embodiment of the invention.

FIG. 14 is a flow chart of the operation of the camera device according to an embodiment of the invention. Referring to FIG. 1, FIG. 9, and FIG. 14, in this embodiment, the camera device 100 operates in a power-saving mode by default. Therefore, the camera device 100 enters the power-saving mode when it is powered on, as step 500 indicates. According to an embodiment of the invention, in the power-saving mode, only the microprocessor 240, the grip sensor 250, the BLE module 252, the first input unit 130 and the second input unit 140 (when the first input unit 130 and the second input unit 140 are the input units made of electronic components) operate in a standby mode so as to detect the wake event. The remaining components, such as the central processing unit 220, the lens 120 and the image sensor 210 operate in a sleep mode to reduce power consumption. The microprocessor 240 may determine whether a wake event happens via the grip sensor 250, the first input unit 130, and/or the BLE module 252, as step 502 indicates. In this embodiment, the wake event may comprise the grip sensor 250 detecting that the user is gripping the camera device 100, the first input unit 130 or the second input unit 140 detecting an input from the user (for example, pressing), or the BLE module 252 detecting that the camera device 100 has been successfully paired with an electronic device or established a communication with the electronic device. When the microprocessor 240 determines that a wake event has happened, the microprocessor 240 generates a control signal to wake up the central processing unit 220, as step 504 indicates. In this embodiment, the microprocessor 240 transmits a control signal 241 to awaken the central processing unit 220, and/or transmit another control signal 242 to the charging control IC 260, such that the charging control IC 260 can supply power to the central processing unit 220 according to the control signal 242. When the central processing unit 220 is awakened, an enable signal 221 is produced by the central processing for waking and enabling the image sensor 210 and the lens 120. Then, the microprocessor 240 or the central processing unit 220 can determine whether the first input unit or the second input unit 140 detects the input from the user, as step 506 indicates. If the first input unit 130 detects the input from the user, the image sensor 210 captures the image 210-1 through the lens 120, as step 508 indicates. If the first input unit 130 does not detect input from the user, the microprocessor 240 or the central processing unit 220 determines whether the idle time of the camera device 100 exceeds a predetermined time (5 min, for instance), as per step 510. If the idle time of the camera device 100 exceeds the predetermined time, then step 500 is performed again and the camera device 100 switches to the power-saving mode. Otherwise, if the idle time of the camera device 100 does not exceed the predetermined time, step 506 is performed again to detect the input from the user. When the image sensor 210 captures the image 210-1 through the lens 120, an image-processing step can be applied to the image 210-1 (for example, the image processing step shown in FIG. 10). Finally, the modified image 210-1 can be stored in the non-volatile memory unit 294, as step 512 indicates.

In some embodiments, the camera device 100 may comprise two lenses 120 and two image sensors 210 electrically connected to the central processing unit 220. The two lenses may be adjacent to each other. For example, one lens may be disposed above, below, or in the left or right side of another lens. One of the lenses and one of image sensors may be used to capture an image, the other lens and image sensor may be used to capture another image for calculating information about the depth of the field. Thus, the photo taken by the camera device 100 can have a depth-of-field effect.

Figure 15:
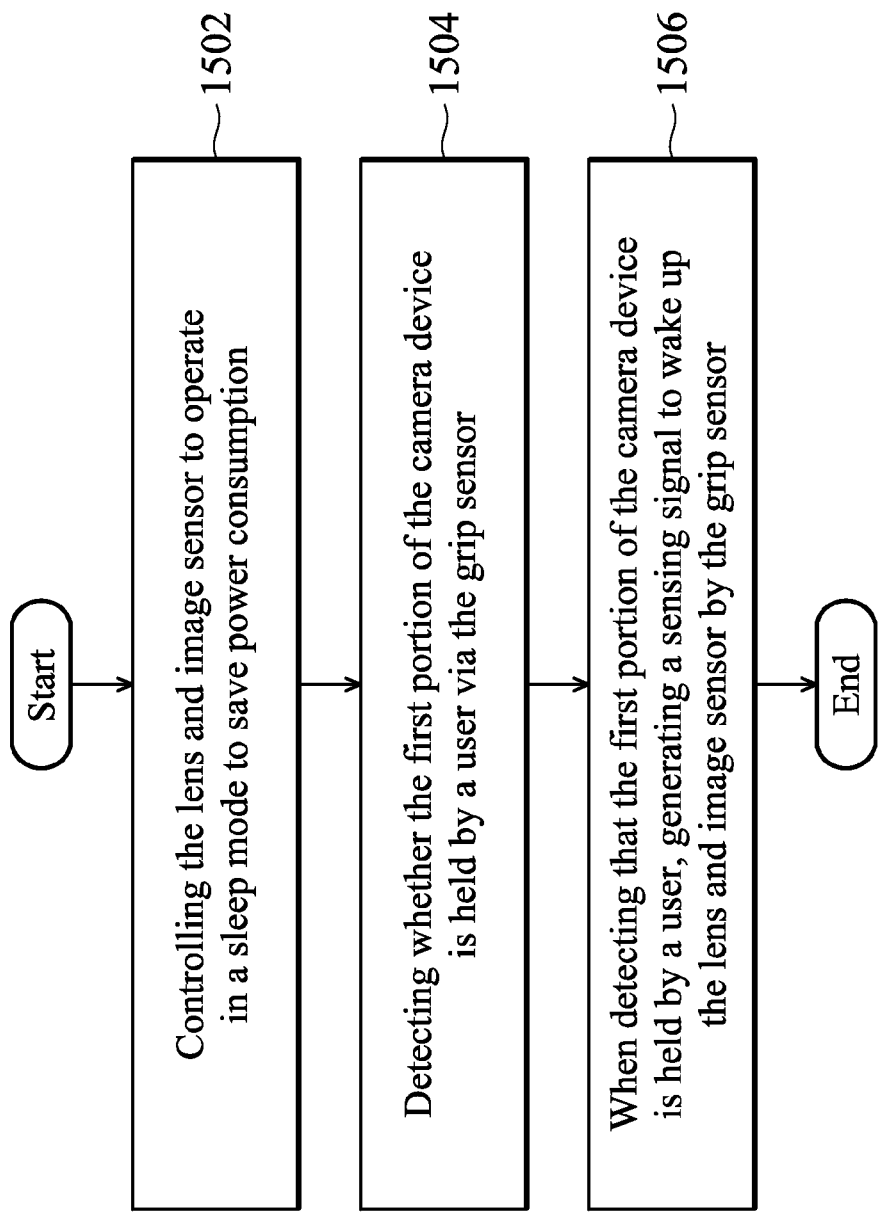
FIG. 15 is a flow chart of a method for controlling the camera device according to an embodiment of the invention.

FIG. 15 is a flow chart of a method for controlling the camera device according to an embodiment of the invention. The method is applicable to the aforementioned camera device 100. First of all, most elements, including the lens and image sensors, of the camera device 100 are controlled to operate in a sleep mode to reduce power consumption (Step 1502). Next, whether the first portion of the camera device 100 is held by the user is detected via the grip sensor (Step 1504). When detecting that the first portion of the camera device 100 is held by the user, the grip sensor generates a sensing signal to wake up the lens and image sensor (Step 1506).

In summary, a camera device is proposed in the invention. The housing of the camera device has an L-shaped structure, such that the camera device can be easily gripped by the user and will not easily slip out of the user's hand. Furthermore, a first input unit for photographing is disposed on the connecting portion of the housing, and an annular member is disposed around the first input unit, such that the position of the first input unit can be directly perceived by touching without visual contact. Moreover, it is not mandatory for a viewfinder to be equipped in the proposed camera device, thereby reducing the volume and weight of the camera device. In addition, the shape of the camera device is ergonomically made to fit the shape of the human hand, so that it is easy for the user to hold it and operate it with a single hand.

In addition, the camera device basically operates in three modes, comprising a power-saving mode, a wake-up mode and a photography mode. In the power-saving mode, only a few components operate in the standby mode to detect a wake event. The remaining components operate in the sleep mode to save power. In the wakeup mode and/or photography mode, all the components are awake and able to execute their corresponding functions. In addition, the camera device may comprise a gravity sensor and a grip sensor. The inclined image data caused by inclination of the camera can be avoided by the gravity sensor, and each unit in the image capturing module can be enabled by the grip sensor when the user grips the first portion, so that a power button can be omitted.

Use of ordinal terms such as "first", "second" etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A camera device, comprising:
   a housing integrally formed in one piece, the housing comprising:
      a cylindrical first portion;
      a cylindrical second portion; and
      a curved portion, being a bent cylindrical sleeve, disposed between the cylindrical first portion and the cylindrical second portion, directly connecting the cylindrical first portion and the cylindrical second portion, and comprising a curved surface;
   a lens, disposed on an end surface of the housing;
   an image sensor, coupled to the lens for capturing image data through the lens;
   a first input unit, disposed on the curved surface of the curved portion and provided as a first input interface for a user; and
   a grip sensor, disposed on the cylindrical first portion for sensing whether the cylindrical first portion is held by the user, and sensing orientation of the camera device when being held by the user,
   wherein the image sensor operate in a sleep mode by default to reduce power consumption and when the grip sensor senses that the cylindrical first portion is held by the user, the grip sensor generates a sensing signal to wake up the image sensor.

2. The camera device as claimed in claim 1, further comprising:
   an annular member, disposed around the first input unit, wherein a material of the annular member is different from that of the curved portion.

3. The camera device as claimed in claim 1, wherein the first input unit is a button, and when the first input unit is pressed, the lens and image sensor are triggered to take a picture or record a video.

4. The camera device as claimed in claim 1, further comprising:
   an opening, formed on the curved surface with the first input unit disposed in the opening.

5. The camera device as claimed in claim 1, wherein the cylindrical first portion and the cylindrical second portion comprise a cylindrical structure, and the cylindrical first portion, the cylindrical second portion, and the curved portion respectively comprise a circular cross-section.

6. The camera device as claimed in claim 1, further comprising:
   a second input unit, disposed on the cylindrical first portion and provided as a second input interface for the user, wherein the first input unit and the second input unit are disposed on the opposite sides of the housing.

7. The camera device as claimed in claim 6, wherein when one of the first input unit and the second input unit is pressed, the lens and the image sensor are triggered to take a picture or record a video.

8. The camera device as claimed in claim 6, wherein when one of the first input unit and the second input unit is set as a shutter button to trigger the lens and the image sensor, the other of the first input unit and the second input unit is set as a switch button for switching a camera mode.

9. The camera device as claimed in claim 1, further comprising:
   a microprocessor; and
   a Bluetooth low energy module, providing Bluetooth communication services,
   wherein the camera device operates in a power-saving mode, when the camera device operates in the power-saving mode, the lens and the image sensor operates in the sleep mode and the grip sensor, the microprocessor and the Bluetooth low energy module operates in the standby mode to detect a wake event, and when the wake up event is detected, the lens and the image sensor are awakened.

10. The camera device as claimed in claim 1, further comprising:
- a gravity sensor, sensing a gravitational parameter; and
- a central processing unit, periodically receiving the gravitational parameter from the gravity sensor and detecting an inclined state of the camera device,
- wherein when the central processing unit determines that an inclined angle of the camera device does not exceed a predetermined angle, the central processing unit performs tilt correction on the image data to obtain a modified image.

11. The camera device as claimed in claim 1, further comprising:
- a gravity sensor, sensing a gravitational parameter; and
- a central processing unit, periodically receiving the gravitational parameter from the gravity sensor and detecting variance of the gravitational parameter within a time interval to determine whether the camera device is in a shaking state.

12. A method for controlling a camera device, for a camera device comprising a housing integrally formed in one piece, a lens, an image sensor, a first input unit and a grip sensor, the housing comprising a cylindrical first portion, a cylindrical second portion and a curved portion, being a bent cylindrical sleeve, disposed between the cylindrical first portion and the cylindrical second portion, directly connecting the cylindrical first portion and the cylindrical second portion, and comprising a curved surface, the lens being disposed on an end surface of the housing, the image sensor being coupled to the lens for capturing image data through the lens, the first input unit being disposed on the curved surface of the curved portion and provided as a first input interface for a user, and the grip sensor being disposed on the cylindrical first portion, the method comprising:
- controlling the image sensor to operate in a sleep mode to reduce power consumption;
- sensing whether the cylindrical first portion is held by the user via the grip sensor;
- sensing orientation of the camera device when being gripped by the user via the grip sensor; and
- generating a sensing signal to wake up the image sensor when sensing that the cylindrical first portion is held by the user.

13. The method as claimed in claim 12, further comprising:
- when the first input unit is pressed, taking a picture or recording a video via the lens and the image sensor.

14. The method as claimed in claim 12, wherein the camera device further comprises a second input unit disposed on the cylindrical first portion and provided as a second input interface for the user, wherein the first input unit and the second input unit are disposed on the opposite sides of the housing, and the method further comprises:
- when one of the first input unit and the second input unit is pressed, taking a picture or recording a video via the lens and the image sensor.

15. The method as claimed in claim 14, further comprising:
- setting one of the first input unit and the second input unit as a shutter button to trigger the lens and the image sensor according to the orientation of the camera device, and setting the other of the first input unit and the second input unit as a switch button for switching a camera mode.

16. The method as claimed in claim 12, wherein the camera device further comprises a microprocessor and a Bluetooth low energy module, and the method further comprising:
- controlling the grip sensor, the microprocessor and the Bluetooth low energy module to operate in a standby mode when the camera device operates in a power-saving mode, wherein the camera device operates in the power-saving mode by default, and when the camera device operates in the power-saving mode, the image sensor operates in the sleep mode;
- detecting a wake event via the grip sensor, the first input unit and the Bluetooth low energy module; and
- waking up the image sensor when any of the grip sensor, the first input unit and the Bluetooth low energy module detects the wake event.

17. The method as claimed in claim 16, wherein when the first input unit is pressed, the first input unit detects a wake event.

18. The method as claimed in claim 16, wherein when the grip sensor senses that the cylindrical first portion is held by the user, the grip sensor detects a wake event.

19. The method as claimed in claim 16, wherein when the Bluetooth low energy module has successfully paired with an electronic device or established a communication with the electronic device, the Bluetooth low energy module detects a wake event.

20. The method as claimed in claim 12, wherein the camera device further comprises a gravity sensor sensing a gravitational parameter and a central processing unit, the method further comprising:
- periodically receiving the gravitational parameter from the gravity sensor by the central processing unit to detect an inclined angle of the camera device;
- determining whether the inclined angle of the camera device exceeds a predetermined angle; and
- when the inclined angle of the camera device does not exceed the predetermined angle, performing tilt correction on the image data to obtain a modified image by the central processing unit.

21. The method as claimed in claim 12, wherein the camera device further comprises a gravity sensor for sensing a gravitational parameter and a central processing unit, the method further comprising:
- periodically receiving the gravitational parameter from the gravity sensor by the central processing unit to detect variance of the gravitational parameter within a time interval; and
- determining whether the camera device is in a shaking state according to the variance of the gravitational parameter within the time interval.

* * * * *